United States Patent
Fukui

(10) Patent No.: US 8,823,367 B2
(45) Date of Patent: Sep. 2, 2014

(54) ROTATION ANGLE DETECTION APPARATUS

(75) Inventor: Noriyuki Fukui, Aichi (JP)

(73) Assignee: Okuma Corporation, Aichi (JP)

( * ) Notice: Subject to any disclaimer, the term of this patent is extended or adjusted under 35 U.S.C. 154(b) by 357 days.

(21) Appl. No.: 13/166,593

(22) Filed: Jun. 22, 2011

(65) Prior Publication Data

US 2011/0316530 A1    Dec. 29, 2011

(30) Foreign Application Priority Data

Jun. 23, 2010   (JP) ................................ 2010-142200

(51) Int. Cl.
    *G01B 7/30*     (2006.01)
    *G01D 5/244*     (2006.01)

(52) U.S. Cl.
    CPC ................ *G01B 7/30* (2013.01); *G01D 5/2449* (2013.01)
    USPC ............ 324/207.25; 324/207.11; 324/207.15; 324/207.24; 324/207.26

(58) Field of Classification Search
    CPC ..... G01B 7/30; G01D 5/2449; G01D 5/2497; G01D 5/147
    USPC ............. 324/207.15, 207.26, 207.11, 207.25, 324/207.24, 166, 117 R, 262, 244, 225, 260, 324/252, 228, 207.22; 104/281, 282, 284; 310/90.5, 12.09, 156.38
    See application file for complete search history.

(56) References Cited

U.S. PATENT DOCUMENTS 6,750,445 B1    6/2004   Sakai et al.
2007/0120713 A1    5/2007   Hayashi

FOREIGN PATENT DOCUMENTS

| JP | 11183201 A | 7/1999 |
|---|---|---|
| JP | 2006322764 A | 11/2006 |
| JP | 2007147462 A | 6/2007 |
| JP | 2009258002 A | 11/2009 |

OTHER PUBLICATIONS

English patent abstract of JP 2009-258002, Data supplied from espacenet database—Worldwide, 1 page.
English patent abstract of JP 11-183201, Data supplied from espacenet database—Worldwide, 1 page.
English patent abstract of JP 2006-322764, Data supplied from espacenet database—Worldwide, 1 page.
Office Action issued in corresponding Japanese Application No. 2010-142200 dated Jul. 30, 2013 with English translation (3 pages).

*Primary Examiner* — Arleen M Vazquez
*Assistant Examiner* — Son Le
(74) *Attorney, Agent, or Firm* — Osha Liang LLP

(57) ABSTRACT

In a rotation angle detection apparatus, a signal detected by a magnetoresistive element is digitalized before being subjected to subtraction of the optimum correction parameter therefrom in a subtractor, the optimum correction parameter being stored in advance in a memory. Note that during the initial transmission at the time of activation, the data size "n" of a detection target obtained by a CPU from a control device is transferred to the memory, so that the optimum correction parameter for the data size of the detection target is selected. With the above, the detection unit can relatively readily cope with a request for enlargement or the like of a through hole size made by a machine side, and detection accuracy is not deteriorated and an error in absolute position processing is reduced when the curvature of the detection target is changed.

8 Claims, 6 Drawing Sheets

ROTATION ANGLE DETECTION APPARATUS

CROSS-REFERENCE TO RELATED APPLICATIONS

This application claims priority to Japanese Patent Application No. 2010-142200, filed on Jun. 23, 2010, which is incorporated herein by reference in its entirety.

BACKGROUND OF THE INVENTION

1. Field of Invention

One or more embodiments of the present invention relate to a rotation angle detection apparatus for use in fields of industrial machinery, machine tools, and so forth, and in particular, to a rotation angle detection apparatus having a detection unit that can cope with detection targets in a plurality of sizes.

2. Background Art

In response to an increasing demand for machining of extra-large parts in the fields of wind power generation, oil drilling, and the like, numbers of extra-large machine tools have been recently increased. Accordingly, the diameter of a rotation shaft has become larger, and so has that of a rotation angle detection apparatus mounted on the rotation shaft.

FIG. 3 is a cross sectional view of an example of a conventional hollow rotation angle detection apparatus, the structure of which will be outlined below. That is, a slit disk 202 is fixedly mounted on a rotation shaft 201 having a through hole formed therethrough with rotation deflection adjusted, and a regular bright and dark grid is applied to the slit disk 202. Meanwhile, a light emitting device 203 and a light receiving device 204 are securely mounted on the housing 208 so as to together sandwich the slit disk 202. While the slit disk 202 rotates with rotation of the rotation shaft 201, the light receiving device 204 detects parallel light from the light emitting device 203, and sends a voltage level resulting from photoelectric conversion to a processing circuit substrate 205. The processing circuit substrate 205 carries out an interpolation operation or the like, based on the voltage value transmitted, to calculate a rotation position of the rotation shaft 201.

This structure has bearings 206a, 206b and a coupling 207, in which a detection unit is not separated from a detection target. Therefore, the size of a component on the machine side that is inserted through the through hole needs to be smaller than the diameter of the through hole formed in the rotation shaft 201. When a hollow rotation angle detection apparatus having a larger through hole is requested, it is necessary to newly design a structure of the entire hollow rotation angle detection apparatus. Such a structure having integrated detection unit and detection target is described in, for example, Japan Patent Laid-open Application No. 2009-258002.

Meanwhile, there has been a case in which a rotation angle detection apparatus having a detection unit separated from a detection target is used. For example, Japan Patent Laid-open Application No. Hei 11-183201 describes a structure in which an encoder can be separated from a detection unit. Further, Japan Patent Laid-open Application No. 2006-322764 describes a highly accurate rotation angle detection apparatus. FIG. 4 is a perspective view showing one example of such a conventional rotation angle detection apparatus. Specifically, a detection target comprising a detection gear 301 and an absolute position encoding disk 302 is securely mounted on the rotation shaft or the like on the machine side (not shown). The detection gear 301 is a spur gear having 360 teeth and a module of 0.4 with a basic pitch length of about 1.256 mm, in which the inner diameter is $\phi 100$ mm. The absolute position encoding disk 302 has irregular cut-offs formed on the external circumference thereof to binarize a code using the cut-offs. The one-bit length is equal to the basic pitch length of the detection gear 301, being about 1.256 mm, and an irregular cyclic code is given such that each of the codes for respective sets of nine successive bits read is unique.

Meanwhile, a detection unit 303, fixedly mounted on a non-rotating member, such as a flange, on the machine side (not shown), includes eight magnetoresistive elements for detecting a magnetic flux density that will change due to the uneven part on the detection gear 301, and nine magnetoresistive elements for detecting a magnetic flux density that will change due to the cut-offs on the absolute position encoding disk 302.

The eight magnetoresistive elements for detecting the uneven part of the detection gear 301 are placed so that orthogonal two-phase signals are obtained. That is, relative to a first element used as a reference, second, third, fourth, fifth, sixth, seventh, and eighth elements are arranged displaced in the measurement axial direction by ¼ pitches (about 0.314 mm), ½ pitches, ¾ pitches, 1 pitch, 5/4 pitches, 3/2 pitches, and 7/4 pitches, respectively, in which the first and fifth elements detect a sine positive phase, the second and sixth elements detect a cosine positive phase, the third and seventh elements detect a sine negative phase, and the fourth and eighth elements detect a cosine negative phase. Meanwhile, the nine magnetoresistive elements for detecting the cut-offs of the absolute position encoding disk 302 are arranged so that a signal that binarizes presence or absence of a cut-off can be obtained. That is, the nine elements are arranged apart from each other by one pitch length so that a code for nine successive bits is read.

It is assumed here that the through hole of the rotation angle detection apparatus is desired to be enlarged from $\phi 100$ mm to $\phi 150$ mm. FIG. 5 is a perspective view of a rotation angle detection apparatus having a through hole of $\phi 150$ mm. The detection gear 401 is a spur gear having 500 teeth and a module of 0.4 with a basic pitch length of about 1.256 mm long, in which the inner diameter thereof is $\phi 150$ mm. The absolute position encoding disk 402 has irregular cut-offs formed on the external circumference thereof to binarize a code using the cut-offs, similar to the example shown in FIG. 4. The one-bit length is equal to the basic pitch length of the detection gear 401, namely, about 1.256 mm. An irregular cyclic code is given such that each of the codes for respective sets of nine successive bits is unique.

Meanwhile, a structure identical to that of the detection unit 303, shown in FIG. 4, is used for the detection unit 303. As the detection gears 301 and 401 have an identical basic pitch length, it is unnecessary to change the positions of the eight magnetoresistive elements for detecting the uneven parts of the gear 401. Similarly, as the absolute position encoding disks 302 and 402 have the same basic pitch length, it is unnecessary to change the positions of the nine magnetoresistive elements. Machining of gears having an identical basic pitch length (a product of a module and the Ludolphian number) but a different number of teeth is achievable using the same tool (a hub cutter). Therefore, designing, a process programming period, and so forth, for manufacturing a new detection gear is not much of a problem. That is, as described above, as long as a detection target is separated from a detection unit and the basic pitch of detection targets are the same despite being different sizes, the detection unit can cope with detection targets in various sizes, so that a request on a threshold hole size made by a machine side can be relatively easily coped with.

FIG. 6 is a diagram showing a schematic structure of a circuit for processing a signal obtained by the detection unit shown in FIG. 5. A resistance change level (a voltage level after conversion) generated by the magnetoresistive element 101a to 101h for detecting a magnetic flux density that will change due to the uneven part of the detection gear 401 is sent to the differential amplifier 102a, 102b so that signals in the same phase are connected to each other and amplified by utilizing a difference in polarity, and thereafter, digitalized in the analogue/digital converter 103a, 103b. The digitalized two-phase signal Sdo, Cdo is subjected to subtraction of an offset correction value Sofs, Cofs therefrom by the subtractor 105a, 105b, in which the offset correction values Sofs, Cofs are stored in advance in the memory 104a. The two-phase signal Sd, Cd with an offset component removed therefrom is converted into a tangent signal Tan_d by the divider 106, and is then subjected to an arctangent operation by the operation unit 107a to thereby obtain an absolute position θp within the basic pitch.

A resistance change level (a voltage level after conversion) generated by the magnetoresistive element 101i to 101q (for brevity, the nine elements are not all shown) for detecting a magnetic flux density that will change due to the cut-offs of the absolute position encoding disk 402 is amplified by the amplifier 102c to 102k before being digitalized by the analogue/digital converter 103c to 103k into a digital signal A1do to A9do. The digital signal A1do to A9do is subjected to subtraction therefrom of a threshold level (an offset correction value) A1ofs to A9ofs for binary determination by the subtractor 105c to 105k to be a positive/negative binarized signal A1d to A9d, in which the threshold levels A1ofs to A9ofs are stored in advance in the memory 104b.

The positive/negative binarized signal A1d to A9d is subjected to absolute position processing in the operation unit 107d together with the value "500" indicative of the data size (the number of teeth of the detection gear 401 or the maximum code length of the absolute position code of the absolute position encoding disk 402) on a detection target, obtained from the control unit 108 connected to the rotation angle detection apparatus, to thereby obtain a position θa indicative of a position within one rotation divided into 500 parts. Thereafter, the absolute position θp within the basic pitch and the position θa indicating a position within one rotation divided into 500 parts are subjected to digit adjustment (a bonding process) by the CPU 107c to thereby obtain an in-rotation absolute position θ.

A rotation angle detection apparatus having the above described detection unit can relatively easily cope with various through hole sizes, that is, various kinds of gear sizes (the number of teeth). However, although various detection gears 301, 401 or absolute position encoding disks 302, 402 can be coped with, the distances from the magnetoresistive elements 101a to 101q, placed relatively far from the center of the detection unit, to a detection target are changed significantly as the size of the detection target is changed.

Regarding the example of the magnetoresistive elements 101a to 101q, shown in FIG. 6, of the magnetoresistive elements 101a to 101h for detecting a magnetic flux density that will change due to the uneven part of the detection gear 401, the distances from the magnetoresistive elements 101a, 101b, 101g, and 101h, placed relatively close to ends in the measurement axial direction, to a detection target are changed significantly as the size of the detection gear 401 is changed, and the middle level in change of a signal, that is, an offset level, is also changed. This leads to a case in which the offset correction values Sofs, Cofs stored in the memory 104a are not optimum.

Similarly, on the absolute position code side, the distances from the magnetoresistive elements 101i to 101q, placed relatively far from the central position, to a detection target are changed significantly as the size of the absolute position encoding disk 402 is changed. Accordingly, the middle level in change of a signal, that is, a threshold level (an offset level), is also changed. This leads to a case in which the threshold level (an offset correction value) stored in the memory 104b is not optimum.

SUMMARY OF THE INVENTION

According to the above described conventional rotation angle detection apparatus in which a detection target is not separated from a detection unit, it has been necessary to newly design the entire rotation angle detection apparatus in order to meet a request for a larger through hole size made by a machine side.

According to a conventional rotation angle detection apparatus designed to solve this problem, in which a detection target is separated from a detection unit, a request from a machine side for a larger through hole size can be relatively easily coped with. However, a problem is caused in that a detection element in the detection unit is subjected to an error causing factor, that is, an offset change caused by change in the curvature of a detection target. An offset change of a detection element for detecting a magnetic flux density that will change due to the uneven part of a detection gear may become a direct cause of deterioration in detection accuracy, which is the most important criterion for a rotation angle detection apparatus, while an offset change of a detection element for detecting a magnetic flux density that will change due to the cut-offs of the absolute position encoding disk may provoke a possible error in binary determination, which may resultantly lead to an abnormal state, such as an error in absolute position processing.

In view of the above, one or more embodiments of the present invention aim to provide a rotation angle detection apparatus having a detection unit capable of relatively easily coping with a request for enlargement of a through hole size made by a machine side, while causing less deterioration in detection accuracy and a reduced error in absolute position processing in response to change in the curvature of a detection target.

A rotation angle detection apparatus according to one or more embodiments of the present invention is a rotation angle detection apparatus including a detection target, an incremental detection unit, and an absolute position detection unit, in which the detection target has an incremental disk and an absolute position encoding disk, the incremental disk being coaxially mounted on a rotation shaft of a measurement target and having an n-time repetitive regular pattern, and the absolute position encoding disk being mounted coaxial to the incremental disk and having an irregular cyclic code comprising a binary random number sequence having an n-bit maximum length, the incremental detection unit is placed opposite to the incremental disk, and the absolute position detection unit is placed opposite to the absolute position encoding disk, the apparatus comprising a memory for storing a correction parameter according to a repetitive data size n of the detection target; and a calculating unit for calculating a rotation angle of the measurement target, using the correction parameter according to the repetitive data size n, based on detection data obtained by the incremental detection unit and detection data obtained by the absolute position detection unit.

In the rotation angle detection apparatus according to one or more embodiments of the present invention, upon input of data corresponding to the repetitive data size n of the detection target for initial processing at activation from a control device connected to the rotation angle detection apparatus, the correction parameter according to the repetitive data size n of the detection target, stored in advance in the memory, may be reflected in a detection process.

Further, in the rotation angle detection apparatus according to one or more embodiments of the present invention, the correction parameter stored in the memory may be a correction parameter for a threshold level of the absolute position detection unit, and the correction value stored in the memory may be an interpolation correction parameter for the incremental detection unit.

Further, in the rotation angle detection apparatus according to one or more embodiments of the present invention, a basic expression to be applied to the correction parameter may be stored in the memory, and upon input of the data size n of the detection target, the correction parameter may be developed based on the basic expression.

According to a rotation angle detection apparatus according to one or more embodiments of the present invention, it is possible to cope with a request for various through hole sizes made by a machine side by relatively easy designing and manufacturing, while carrying out stable absolute position processing with high detection accuracy, and to produce an advantage of reduction in the development period and product cost. Further, as a single kind of detection unit can be used in various cases, stocks for maintenance can be significantly reduced.

DETAILED DESCRIPTION

Figure 1:
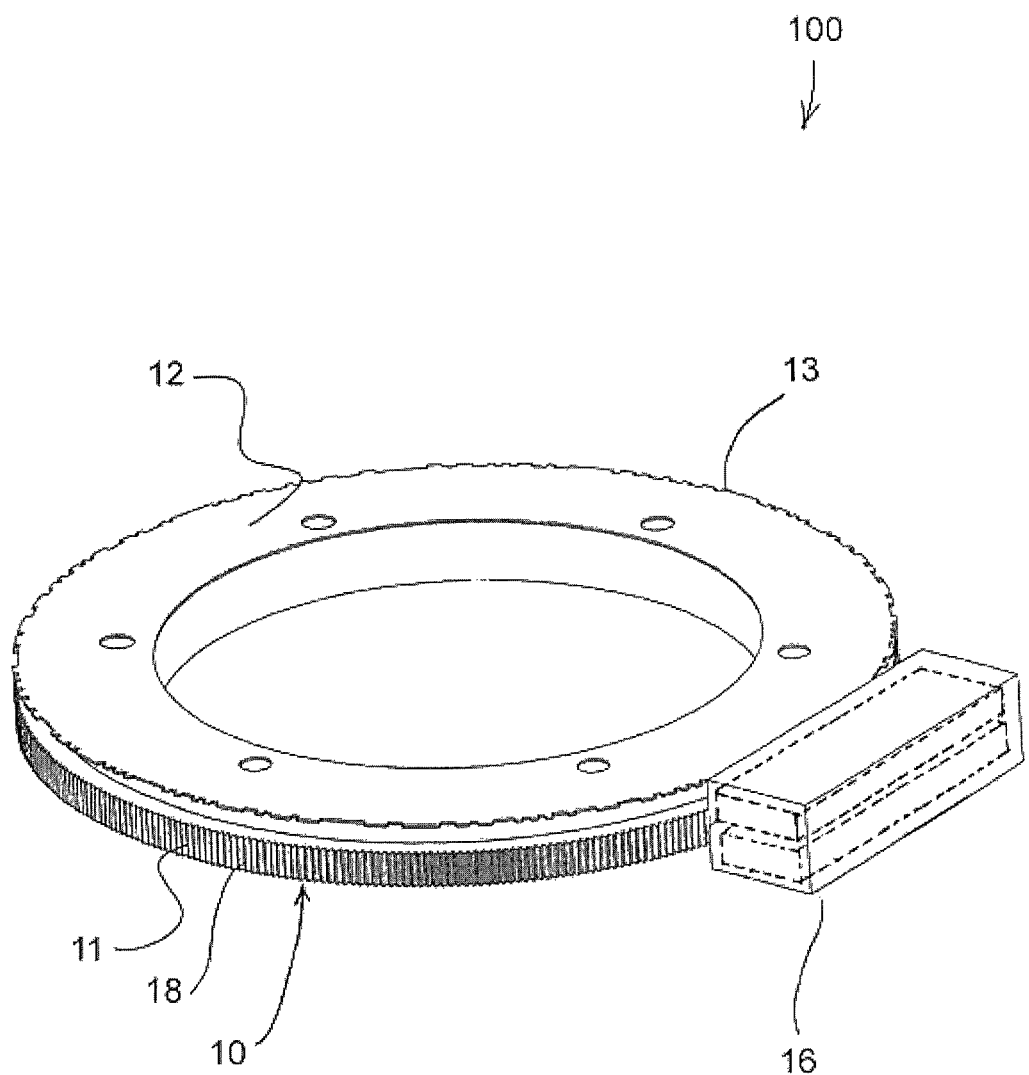
FIG. 1 is a perspective view of a rotation angle detection apparatus according to one or more embodiments of the present invention.

One or more embodiments of the present invention will be described referring to the accompanying drawings. As shown in FIG. 1, a rotation angle detection apparatus 100 in this embodiment comprises a detection target 10 including an incremental disk 11 and an absolute position encoding disk 12, and a detection unit 16. The incremental disk 11 has an n-time repetitive regular pattern and is coaxially and securely mounted on a rotation shaft or the like on the machine side that is a measurement target (not shown). The absolute position encoding disk 12 is mounted coaxial to the incremental disk 11, and has an irregular cyclic code comprising a binary random number sequence with an n-bit maximum length. The detection unit 16 is securely mounted on a non-rotating member, such as a flange, on the machine side (not shown).

The incremental disk 11 is a spur gear having n number of teeth, of which basic pitch length is about 1.256 mm. The absolute position encoding disk 12 has irregular cut-offs formed on the external circumference thereof to binarize a code using the cut-offs, in which one bit length is equal to the basic pitch length of the incremental disk 11, being about 1.256 mm. An irregular cyclic code is given such that each of the codes for respective sets of nine successive bits read is unique.

Meanwhile, the detection unit 16, securely mounted on a non-rotating member, such as a flange or the like, on a machine side (not shown) incorporates eight magnetoresistive elements 101a to 101h (shown in FIG. 2) for detecting a magnetic flux density that will change due to the uneven part 18 of the incremental disk 11, and nine magnetoresistive elements 101i to 101q (shown in FIG. 2) for detecting a magnetic flux density that will change due to the cut-offs 13 of the absolute position encoding disk 12.

The eight magnetoresistive elements 101a to 101h for detecting the uneven part 18 of the incremental disk 11 are arranged so that orthogonal two-phase signals can be obtained. That is, relative to a first one used as a reference, second, third, fourth, fifth, sixth, seventh, and eighth elements are positioned displaced in the measurement axial direction by ¼ pitches (about 0.314 mm), ½ pitches, ¾ pitches, 1 pitch, 5/4 pitches, 3/2 pitches, and 7/4 pitches, respectively. The first and fifth elements detect a sine positive phase; the second and sixth elements detect a cosine positive phase; the third and seventh elements detect a sine negative phase; and the fourth and eighth elements detect a cosine negative phase. Further, the nine magnetoresistive elements 101i to 101q for detecting the cut-offs 13 of the absolute position encoding disk 12 are arranged such that a signal that binarizes presence and absence of a cut-off can be obtained. That is, the nine elements are arranged apart from each other by one pitch length, so that a code for nine successive bits is read.

Figure 2:
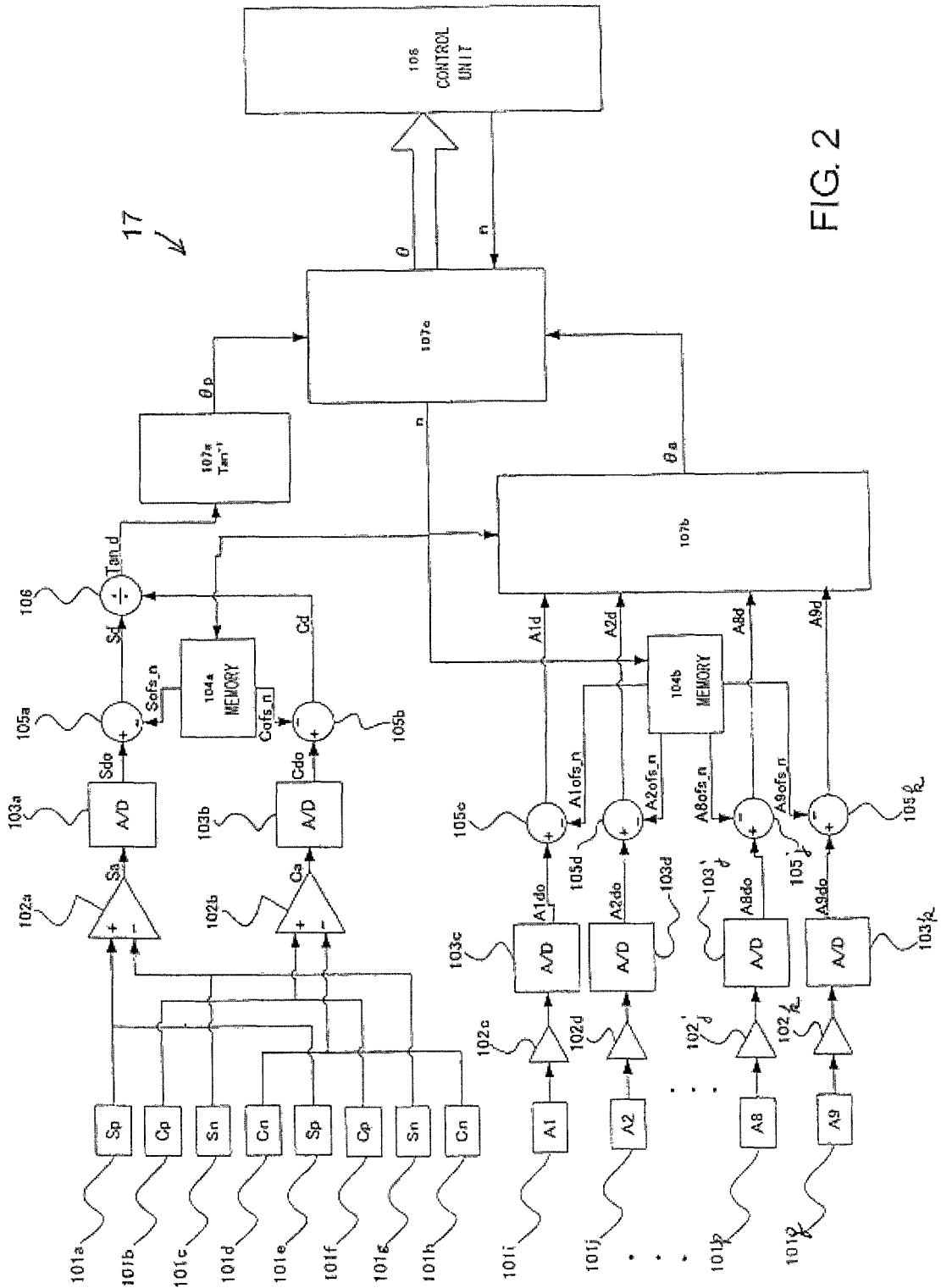
FIG. 2 is a diagram showing a schematic structure of a signal processing circuit of a rotation angle detection apparatus according to one or more embodiments of the present invention.
Figure 3:
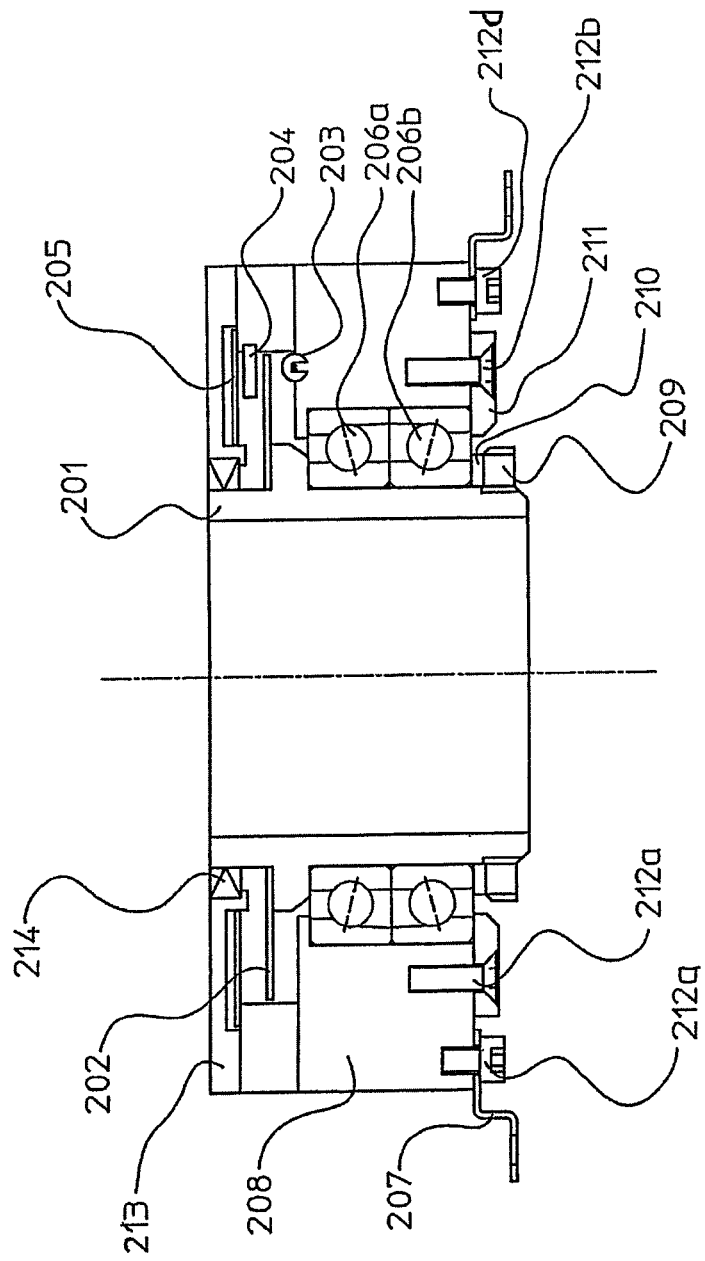
FIG. 3 is a cross sectional view showing one example of a conventional hollow rotation angle detection apparatus.
Figure 4:
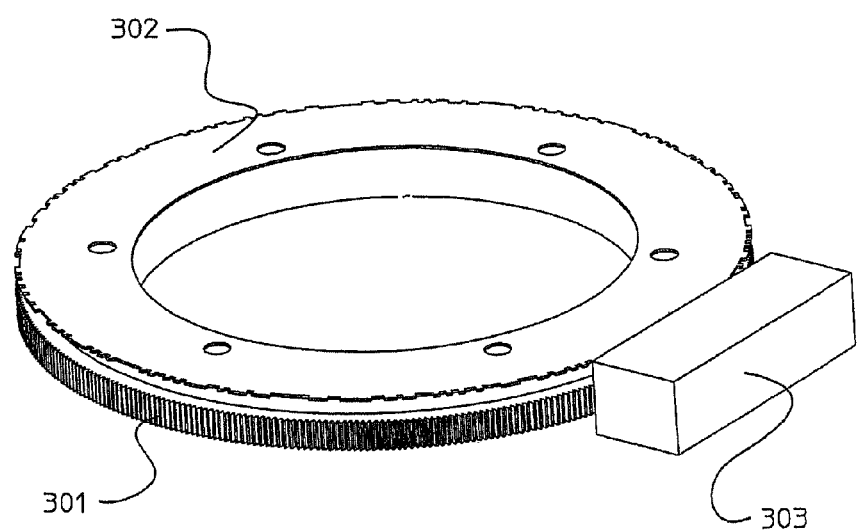
FIG. 4 is a perspective view showing one example of a conventional rotation angle detection apparatus.
Figure 5:
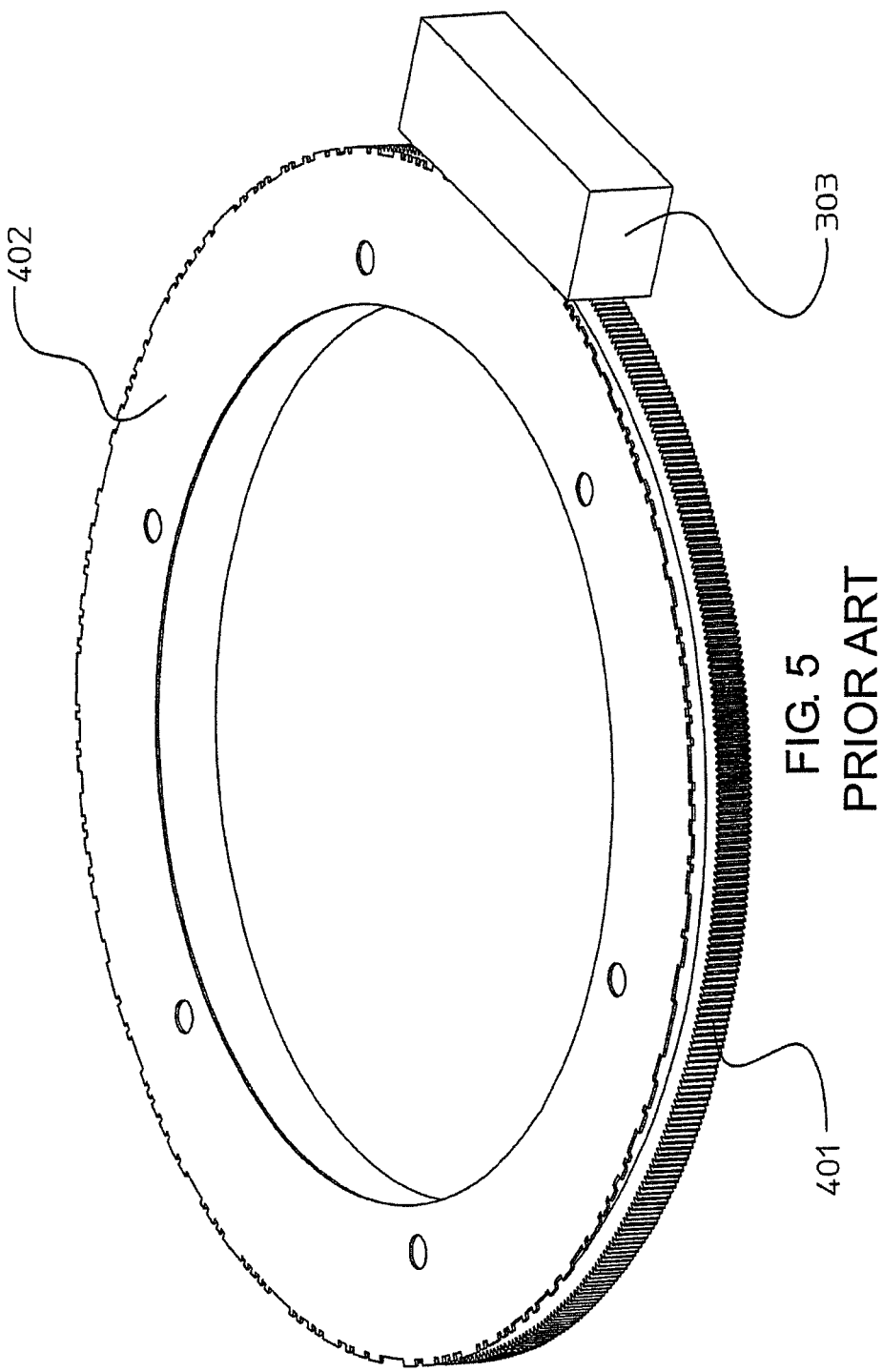
FIG. 5 is a perspective view showing one example of a conventional rotation angle detection apparatus different from that shown in FIG. 4.
Figure 6:
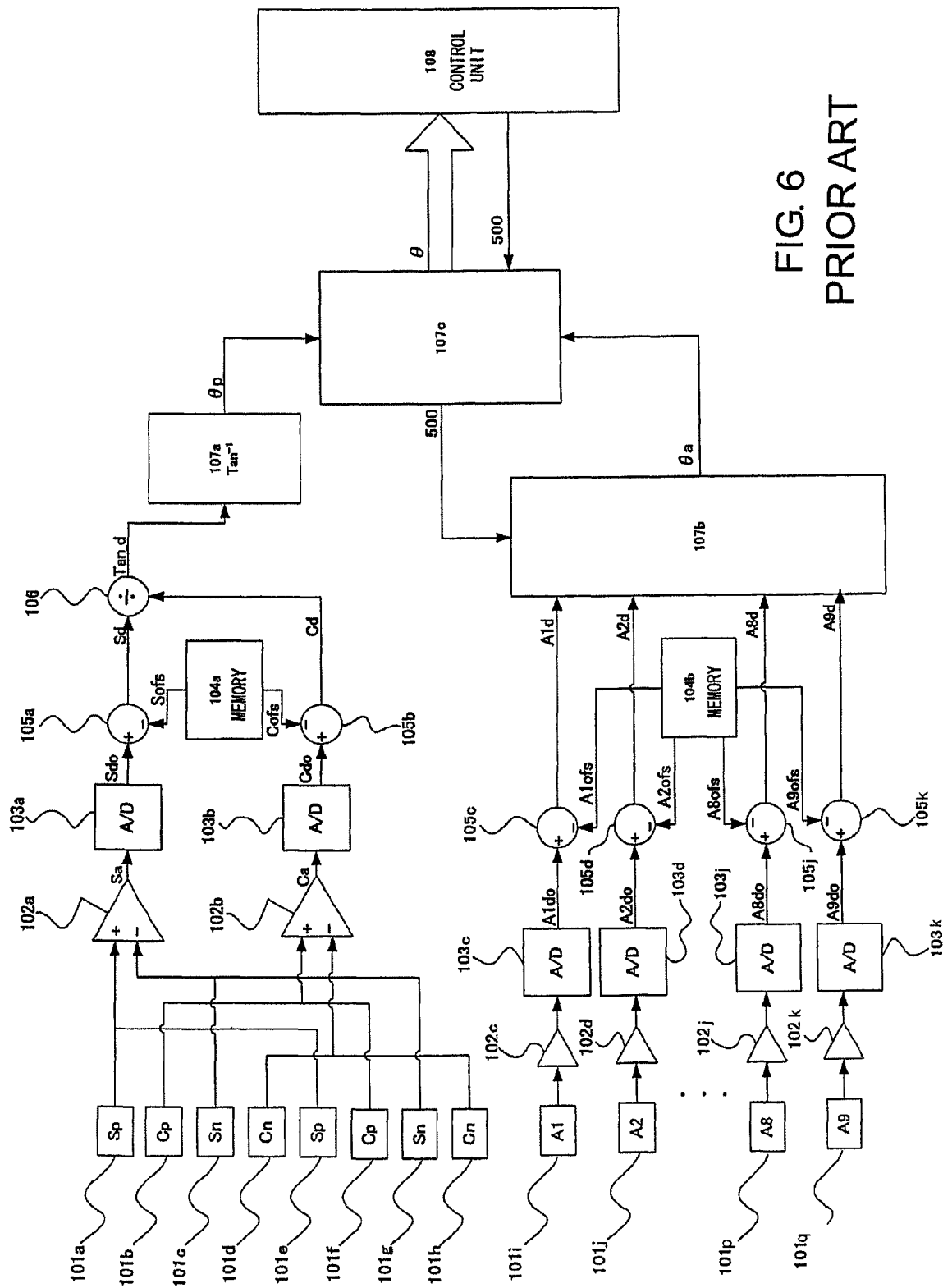
FIG. 6 is a diagram showing a schematic structure of a signal processing circuit of the rotation angle detection apparatus shown in FIG. 5.

FIG. 2 is a diagram showing a schematic structure of a circuit for processing a signal obtained by the detection unit 16. In the circuit, operation units 107a, 107b and a CPU 107c constitute a calculation unit 17. A resistance change level (a voltage level after conversion) generated by the magnetoresistive element 101a to 101h for detecting a magnetic flux density that will change due to the uneven part 18 of the detection incremental disk 11 is sent to the differential amplifier 102a, 102b so that signals in the same phase are connected to each other and amplified utilizing a difference in polarity, and thereafter digitalized in the analogue/digital converter 103a, 103b to be a two-phase signal Sdo, Cdo.

In the memory 104a shown in FIG. 2, offset correction values according to the line-up in size of the detection target 10 of the rotation angle detection apparatus 100 are stored. For example, assume that four kinds of through holes of the detection target 10 are necessary as requested by a machine side, and accordingly, detection gears, or the incremental disk 11 constituting the detection target 10, having 256, 360, 420, and 500 teeth, respectively, are lined up. In this case, the optimum offset correction value for each of the four numbers of teeth is stored in the memory 104a. Meanwhile, the data size "n" of a detection target, obtained by the operation unit 107a from the control unit 108, is transferred to the memory 104a at the time of initial communication, such as at activation, so that the optimum offset correction value for that teeth number n is selected. Therefore, an offset correction value Sofs_n, Cofs_n to be removed from the digital signal Sdo, Cdo is selected in the memory 104a, and an offset component is removed by the subtractor 105a, 106a. The resulting two-phase signal Sd, Cd with an offset component removed therefrom is subjected to tangent signal processing in the divider 106 to be a signal Tan_d, and then to arctangent operation in the operation unit 107a to thereby obtain an absolute position θp within the basic pitch.

As the optimum offset correction value, such as Sofs_n or Cofs_n, for a tooth number, a correction value measured for a combination with a detection gear having that number of teeth is stored in advance. A method for measuring the optimum offset correction value includes a method in which the mid-value between the maximum and minimum values of the signal level Sdo or Cdo is obtained, a method in which an average of all signal levels within the basic pitch is calculated, and so forth. However, the present invention is not limited to a particular method for measuring the optimum offset correction value. In any case, even when the number of teeth of the incremental disk 11 or the detection gear should be changed, an offset component is removed in the optimum manner so that accuracy in detection by the rotation angle detection apparatus 100 is not deteriorated.

In the following, a process carried out by the magnetoresistive element 101i to 101q for detecting a magnetic flux density that will change due to the cut-offs 13 of the absolute position encoding disk 12 will be described.

A resistance change level (a voltage level after conversion) output from the magnetoresistive element 101i to 101q for detecting a magnetic flux density that will change due to the cut-offs 13 of the absolute position encoding disk 12 (for brevity, the nine elements are not all shown) is amplified by the amplifier 102c to 102k before being digitalized in the analogue/digital converter 103c to 103k into a digital signal A1do to A9do.

In the memory 104b, correction parameters for threshold levels according to the line-up in size of the detection target 10 of the rotation angle detection apparatus 100 are stored. Specifically, similar to the memory 104a, a correction parameter for the optimum threshold level for each of the maximum code lengths of the absolute position encoding disk 12 in use is stored in the memory 104b.

Further, the data size "n" of a detection target 10, obtained by the operation unit 107a from the control unit 108, is transferred to the memory 104b at the time of initial communication, such as at activation, so that a correction parameter for the optimum threshold level for the maximum code length n of an absolute position code is selected. Therefore, the optimum threshold level (an offset correction value) A1ofs_n to A9ofs_n is selected in the memory 104b, and removed from the digital signal A1do to A9do in the subtractor 105a, 105b.

The positive/negative binarized signal A1d to A9d is subjected to absolute position processing in the operating unit 107b together with the value, or the data size "n", of the detection target 10, obtained by the rotation angle detection apparatus 100 from the control unit 108 connected, to thereby obtain a position θa indicating a position within one rotation divided into n parts. Thereafter, the absolute position θp within the basic pitch and the position θa indicating a position within one rotation divided into n parts are subjected to digit adjustment (a bonding process) by the CPU 107c to thereby obtain an in-rotation absolute position θ.

As a correction parameter, such as A1ofs_n to A9ofs_n, for a threshold level corresponding to the maximum code length of an absolute position code, the optimum value measured for a combination with the absolute position encoding disk 12 in that size is stored in advance. As a method for determining a correction parameter for the optimum threshold level, a method for determining the mid-value between values with the lowest contrast on the positive and negative respective sides is commonly used. However, the present invention is not limited to any particular method for determining the optimum correction parameter. In any case, even when the maximum code length of an absolute position code of the absolute position encoding disk 12 should be changed, as the thread level is maintained optimum, a possible detection error in binary determination can be reduced.

In the following, one or more embodiments in which a correction parameter can be obtained using a basic expression will be described. Before the description, however, as a factor that may cause change in an offset value and/or a threshold level as a result of change in the curvature of the detection target 10, the following phenomenon will be described.

Note that as a structural element surrounding a magnetoresistive element, a bias magnet (not shown) is additionally provided on the opposite side of the detection target 10 with the magnetoresistive element in-between. In the magnetic flux generated from the bias magnet, an area with a higher magnetic flux density and an area with a lower magnetic flux density are caused due to presence or absence of the uneven part 18 or cut-off 13 of the detection target 10. A magnetoresistive element placed between the bias magnet and the detection target 10 detects the high/low magnetic flux density.

In the above, it is possible to note a property such that when the curvature of the detection target 10 becomes smaller and the distance between the bias magnet and the uneven part 18 or cut-offs 13 becomes resultantly shorter, the range of change (contrast) in the magnetic flux density becomes larger, and so does an offset amount of the magnetic flux density. Therefore, based on experimental research and measurement of the relationship, it is possible to obtain a relationship and regularity between the curvature (data size) of the detection target 10 and an offset component. Alternatively, a relationship and regularity between the curvature (data size) of the detection target 10 and an offset component can be obtained using an analysis method, such as an FEM magnetic field analyzing tool. The thus obtained relationship and regularity is expressed as a basic expression, including an approximate expression, and a correction parameter can be obtained based on the basic expression. An example of a basic expression for calculating a correction parameter for a threshold level related to the magnetoresistive element 101i for detecting a magnetic flux density that will change due to the cut-offs 13 of the absolute position encoding disk 12 is shown below as an expression 1.

$$A1ofs\_n = \alpha \cdot n + \beta \qquad \text{(Expression 1)}$$

wherein n refers to a value indicating the data size of the detection target 10, corresponding to the maximum code length of an absolute position code. That is, as presence of a linear change is determined between the curvature of the detection target 10 and a correction parameter of a threshold level, it is arranged such that the correction value of a threshold level is proportionally changed according to the data size of the detection target 10, as shown in the expression 1.

In the memory 104b, upon input of the data size, namely, n, of the detection target 10, a correction parameter of the threshold level is developed based on the basic expression. An advantage of this arrangement is that whereas it has conventionally been necessary, upon receipt of a new request on the size of the detection target 10, to measure various correction parameters for that size and to input the data into the memories 104a, 104b, it is unnecessary to newly carry out measurement to obtain a parameter, in particular, as various correction parameters are obtained using a basic expression.

Note that the present invention is not limited to a particular formation of a basic expression. Rather, formation of a basic expression may possibly be changed along with change in the detection principle or material (magnetic permeability) of the detection target 10. One or more embodiments of the present invention are characterized solely by development of various optimum correction values for the data size of the detection target 10, using a basic expression.

One or more embodiments of the present invention have been described above. However, the present invention is not limited to the above. Specifically, although a magnetic type that utilizes a magnetoresistive element for the detection principle has been described, the technique of one or more embodiments of the present invention can be applied to an electromagnetic induction type that utilizes a coil. The point is that any apparatus having a detection unit 16 that can cope with the detection targets 10 in various sizes and capable of optimizing various correction parameters in the detection unit 16 in response to change in the curvature of the detection target 10 can be used as a rotation angle detection apparatus 100 according to one or more embodiments of the present invention.

Further, there can be seen a difference in the manner of transmission of a data size from the CPU 107c, or an operating unit, to the memories 104a, 106b in the schematic structural diagrams between the related art and this embodiment. This, however, is only an example. Although various elements are separately shown to describe respective functions thereof, the memories 104a, 104b, the subtractors 105a to 105b, the divider 106, the operation units 107a, 107b, and the CPU 107c may be achieved using a single CPU. Therefore, the present apparatus can be achieved using a structure that cannot be seemingly discriminated from a conventional apparatus. The point is that any apparatus having a function for optimizing various correction parameters in the detection unit 16 during a process in response to change in the curvature of the detection target 10 can be used as a rotation angle detection apparatus 100 according to one or more embodiments of the present invention.

A rotation angle detection apparatus according to one or more embodiments of the present invention can be applied to industrial machines and tool machines.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A rotation angle detection apparatus comprising:
a detection target;
an incremental detection unit;
an absolute position detection unit,
wherein the detection target has an incremental disk and an absolute position encoding disk, the incremental disk being coaxially mounted on a rotation shaft of a measurement target and having an n-time repetitive regular pattern, and the absolute position encoding disk being mounted coaxial to the incremental disk and having an irregular cyclic code comprising a binary random number sequence having an n-bit maximum length, the incremental detection unit is placed opposite to the incremental disk, and the absolute position detection unit is placed opposite to the absolute position encoding disk;
a memory that stores a plurality of correction parameters respectively corresponding to a plurality of detection targets, wherein each detection target of the plurality of detection targets has a different repetitive data size n and a different curvature; and
a calculating unit for calculating a rotation angle of the measurement target,
wherein the calculating unit uses a selected correction parameter from the plurality of stored correction parameters, wherein the selected correction parameter is selected according to the repetitive data size n, and
wherein the calculating unit bases the calculating of the rotation angle of the measurement target on detection data obtained by the incremental detection unit and detection data obtained by the absolute position detection unit.

2. The rotation angle detection apparatus according to claim 1, wherein upon input of data corresponding to the repetitive data size n of the detection target for initial processing at activation from a control device connected to the rotation angle detection apparatus, the correction parameter according to the repetitive data size n of the detection target, stored in advance in the memory, is reflected in a detection process.

3. The rotation angle detection apparatus according to claim 1, wherein the correction parameter stored in the memory is a correction parameter for a threshold level of the absolute position detection unit.

4. The rotation angle detection apparatus according to claim 2, wherein the correction parameter stored in the memory is a correction parameter for a threshold level of the absolute position detection unit.

5. The rotation angle detection apparatus according to claim 1, wherein the correction value stored in the memory is an interpolation correction parameter for the incremental detection unit.

6. The rotation angle detection apparatus according to claim 2, wherein the correction value stored in the memory is an interpolation correction parameter for the incremental detection unit.

7. A rotation angle detection apparatus comprising:
a detection target;
an incremental detection unit;
an absolute position detection unit,
wherein the detection target has an incremental disk and an absolute position encoding disk, the incremental disk being coaxially mounted on a rotation shaft of a measurement target and having an n-time repetitive regular pattern, and the absolute position encoding disk being mounted coaxial to the incremental disk and having an irregular cyclic code comprising a binary random number sequence having an n-bit maximum length, the incremental detection unit is placed opposite to the incremental disk, and the absolute position detection unit is placed opposite to the absolute position encoding disk;
a memory that stores a plurality of correction parameters respectively corresponding to a plurality of detection targets, wherein each detection target of the plurality of detection targets has a different repetitive data size n and a different curvature; and
a calculating unit for calculating a rotation angle of the measurement target,
wherein the calculating unit uses a selected correction parameter from the plurality of stored correction parameters, wherein the selected correction parameter is selected according to the repetitive data size n, and
wherein the calculating unit bases the calculating of the rotation angle of the measurement target on detection data obtained by the incremental detection unit and detection data obtained by the absolute position detection unit, wherein a basic expression to be applied to the correction parameter is stored in the memory, and upon input of the data size n of the detection target, the correction parameter is developed based on the basic expression.

8. A rotation angle detection apparatus comprising:

a detection target;

an incremental detection unit;

an absolute position detection unit, wherein the detection target has an incremental disk and an absolute position encoding disk, the incremental disk being coaxially mounted on a rotation shaft of a measurement target and having an n-time repetitive regular pattern, and the absolute position encoding disk being mounted coaxial to the incremental disk and having an irregular cyclic code comprising a binary random number sequence having an n-bit maximum length, the incremental detection unit is placed opposite to the incremental disk, and the absolute position detection unit is placed opposite to the absolute position encoding disk;

a memory that stores a plurality of correction parameters respectively corresponding to a plurality of detection targets, wherein each detection target of the plurality of detection targets has a different repetitive data size n and a different curvature; and a calculating unit for calculating a rotation angle of the measurement target, wherein the calculating unit uses a selected correction parameter from the plurality of stored correction parameters, wherein the selected correction parameter is selected according to the repetitive data size n, and wherein the calculating unit bases the calculating of the rotation angle of the measurement target on detection data obtained by the incremental detection unit and detection data obtained by the absolute position detection unit, wherein upon input of data corresponding to the repetitive data size n of the detection target for initial processing at activation from a control device connected to the rotation angle detection apparatus, the correction parameter according to the repetitive data size n of the detection target, stored in advance in the memory, is reflected in a detection process, and wherein a basic expression to be applied to the correction parameter is stored in the memory, and upon input of the data size n of the detection target, the correction parameter is developed based on the basic expression.

* * * * *